May 13, 1969 B. T. JOHNSON 3,444,472
SENSE AMPLIFIER CIRCUIT
Filed June 12, 1967
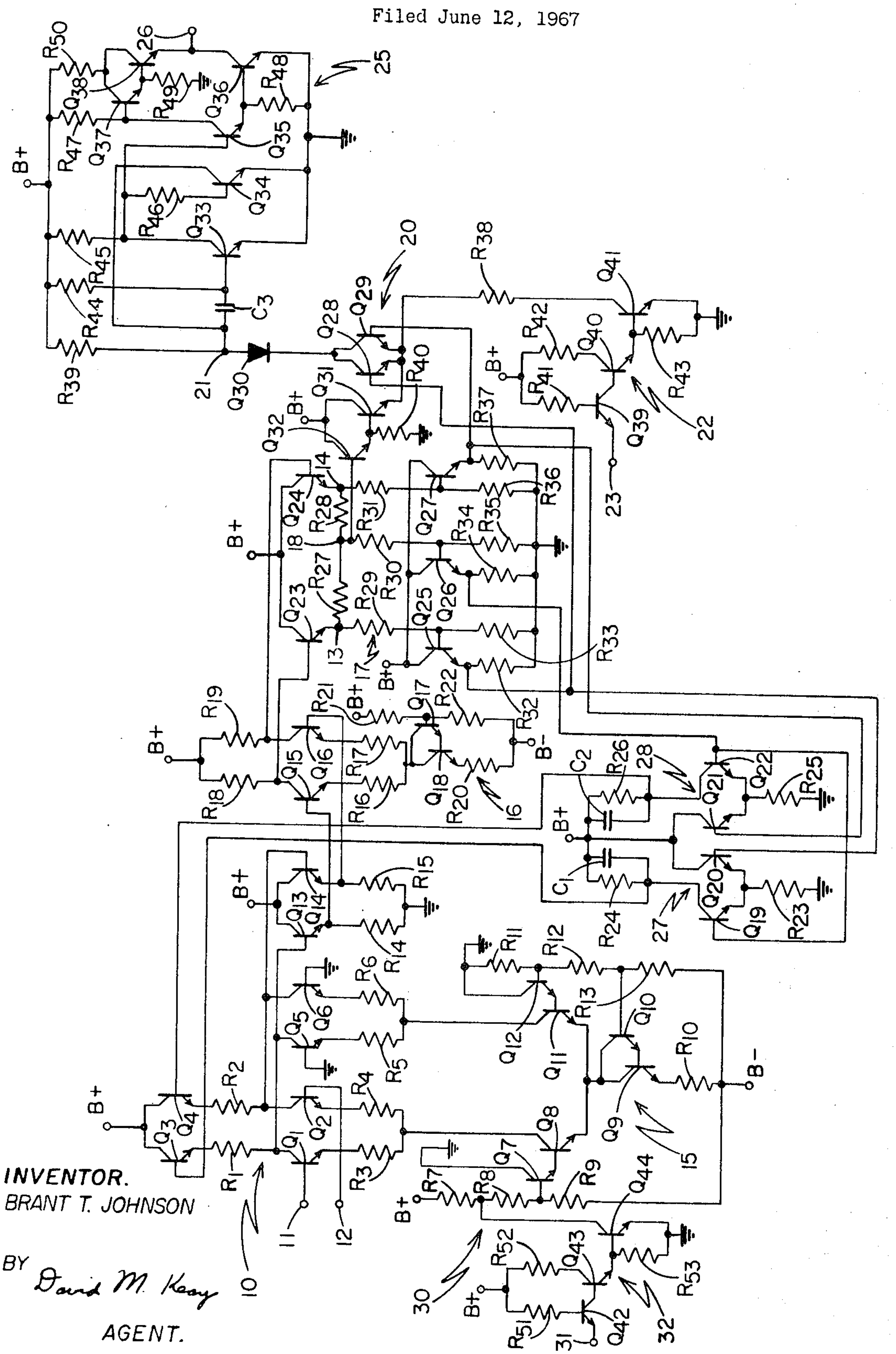
INVENTOR.
BRANT T. JOHNSON
BY David M. Keay
AGENT.

3,444,472
Patented May 13, 1969

3,444,472
SENSE AMPLIFIER CIRCUIT

Brant T. Johnson, Cambridge, Mass., assignor to Sylvania Electric Products Inc., a corporation of Delaware Filed June 12, 1967, Ser. No. 645,427
Int. Cl. H03f *1/34, 1/08*
U.S. Cl. 330—25 10 Claims

ABSTRACT OF THE DISCLOSURE

Sense amplifier circuit including differential amplifier section. Two outputs from the amplifier section are used to produce a reference voltage independent of input signals. The two outputs are compared with the reference voltage in a comparison circuit in order to detect an input signal and to produce an output signal. A feedback arrangement compares the outputs and the reference voltage and adjusts conditions at the input portion of the amplifier in order to balance the quiescent operating conditions. The circuit is amenable to fabrication in monolithic integrated circuit form.

BACKGROUND OF THE INVENTION

This invention relates to amplifier circuits employing transistors. More particularly, it is concerned with a sense amplifier circuit for detecting the output of a magnetic core and producing uniform output signals.

Data is taken from coincident-current ferrite-core memories by means of sense windings on each core. When the data is read out of a core, a pulse is induced in the sense winding indicating the presence of a stored "1" bit. The absence of a pulse during readout indicates the presence of a stored "0" bit. Each sense winding is connected to a sense amplifier which accepts, shapes, and amplifies the induced pulses, and drives logic circuits through which data is transferred to other computer subsystems.

The sense amplifier is a differential amplifier having two input terminals connected to the two ends of a sense winding. The input signal pulse to the sense amplifier is sometimes of one polarity and sometimes of the other. The amplifier accepts pulses of either polarity and produces uniform output pulses which are always of the same polarity.

Many sense amplifier circuits have been designed and are widely used in conjunction with coincident-current ferrite-core memory systems. A particularly useful sense amplifier circuit having desirable characteristics is disclosed and claimed in Patent No. 3,309,538 issued on Mar. 14, 1967, to Matthew C. Abbott and Albert H. Ashley entitled "Sensitive Sense Amplifier Circuits Capable of Discriminating Marginal-Level Info-Signals from Noise Yet Unaffected by Parameter and Temperature Variations" and assigned to the assignee of the present invention.

SUMMARY OF THE INVENTION

The sense amplifier circuit according to the invention includes a differential amplifier section having first and second input terminals adapted to receive input signals as from the sense winding of a ferrite-core memory element. A reference voltage means is associated with first and second output terminals of the amplifier section. The reference voltage means is operable to produce a reference voltage which is determined by the quiescent voltages at the output terminals and is independent of input signals applied to the input terminals. A signal comparison means is connected to the two output terminals and to the reference voltage means and is operable to produce an output signal when the voltage at either of the output terminals differs from the reference voltage by a predetermined amount. A feedback comparison means is also connected to the two output terminals and to the reference voltage means. The feedback comparison means is operable to compare the quiescent voltage at the first output terminal with the reference voltage and the quiescent voltage at the second output terminal with the reference voltage and to produce feedback signals which are indicative of the voltage differentials between the quiescent voltages at the output terminals and the reference voltage. The feedback signals are applied to the differential amplifier section by a feedback means which modifies operation of the differential amplifier section in such a manner that the voltage differentials between the quiescent voltages at the output terminals and the reference voltage become equalized.

The sense amplifier circuit of the invention is particularly useful in ferrite-core memory systems by virtue of its improved electrical characteristics. The circuit provides a very low input offset voltage, a measure of the difference between the voltages at the input terminals when the amplifier is in a quiescent condition. Thus, the response of the circuit to an input signal is substantially independent of the polarity of the signal. The circuit of the invention permits control of the threshold level despite variations in supply voltages and in temperature. The threshold level is the voltage which must be exceeded by an input signal in order for the circuit to produce an output pulse. An appropriate threshold level is therefore important so that noise will be rejected and all input signals will be accepted. The circuit also provides excellent common mode rejection. That is, pulses applied at the input terminals which raise or lower the voltages at both input terminals at the same time are not accepted as input signals and have very little effect on the circuit. Furthermore, by virtue of the circuit components employed and their arrangement the circuit is amenable to fabrication in monolithic integrated circuit form.

BRIEF DESCRIPTION OF THE DRAWING

Various objects, features, and advantages of the circuit of the invention will be apparent from the following detailed discussion and the accompanying drawing wherein the single figure is a schematic circuit diagram of the sense amplifier circuit according to the invention.

DETAILED DESCRIPTION OF THE INVENTION

*Differential amplifier section*

The sense amplifier circuit shown in the single figure of the drawing includes a differential amplifier section 10 having two input terminals 11 and 12 to which the sense winding of a ferrite core may be connected. The differential amplifier section includes several balanced stages of transistor pairs. The final pair of transistors $Q_{23}$ and $Q_{24}$ in the amplifier section are connected as emitter followers and their emitters may be designated output terminals 13 and 14 of the amplifier section.

The input terminals 11 and 12 are connected to the bases of transistors $Q_1$ and $Q_2$, respectively, in the input stage of the amplifier. In the specific embodiment of the invention shown these and all the other transistors are NPN transistors. The collectors of input transistors $Q_1$ and $Q_2$ are connected through resistances $R_1$ and $R_2$ and feedback transistors $Q_3$ and $Q_4$ (whose function will be explained hereinbelow) to a B+ voltage source. The emitters of transistors $Q_1$ and $Q_2$ are connected through resistances $R_3$ and $R_4$, respectively, to a constant current source 15. The constant current source 15 provides a constant current which flows through the two transistors $Q_1$ and $Q_2$. That is, if signals at the input terminals 11 and 12 cause current to increase through one of the two transistors, the current through the other transistors decreases by the same amount. Under balanced quiescent conditions the total current divides equally between the two transistors.

The constant current source 15 is also connected to a by-pass transistor pair $Q_5$ and $Q_6$. A switching arrangement 30 associated with the constant current source 15 can be activated to switch the current flow from the input transistors $Q_1$ and $Q_2$ to the by-pass transistors $Q_5$ and $Q_6$ thereby holding the amplifier section in the quiescent condition despite signals at the input terminals. The operation of the by-pass transistors $Q_5$ and $Q_6$ and the switching arrangement will be explained hereinbelow. Under normal operating conditions of the amplifier section the switching arrangement 30 causes the current from the constant current source 15 to flow through the transistors $Q_1$ and $Q_2$ so that by-pass transistors $Q_5$ and $Q_6$ are not involved in the operation of the amplifier.

The collectors of input transistors $Q_1$ and $Q_2$ are connected directly to the bases of transistors $Q_{13}$ and $Q_{14}$. These transistors are arranged as a pair of emitter followers. Their collectors are connected directly to each other and to the B+ voltage source. Their emitters are connected through resistances $R_{14}$ and $R_{15}$, respectively, to ground.

The emitters of transistors $Q_{13}$ and $Q_{14}$ are connected directly to the bases of transistors $Q_{15}$ and $Q_{16}$ of the next amplifier stage. The collector of transistor $Q_{15}$ is connected to the B+ voltage source through resistance $R_{18}$ and the collector of transistor $Q_{16}$ is connected to the B+ voltage source through resistance $R_{19}$. The emitters of transistors $Q_{15}$ and $Q_{16}$ are connected through resistance $R_{16}$ and $R_{17}$, respectively, to a constant current source 16.

This constant current source includes transistors $Q_{17}$ and $Q_{18}$ which are combined with their collectors connected together and the emitter of transistor $Q_{17}$ connected to the base of transistor $Q_{18}$. The two collectors are connected directly to the resistances $R_{16}$ and $R_{17}$ and the emitter of transistor $Q_{18}$ is connected through a resistance $R_{20}$ to a B− voltage source of equal voltage but opposite polarity from the B+ voltage source. The base of transistor $Q_{17}$ is connected through resistance $R_{21}$ to the B+ voltage source and through the resistance $R_{22}$ to the B− voltage source. The constant current source 16 limits the current through transistors $Q_{15}$ and $Q_{16}$ so that the total current flow through these two transistors is always constant despite variations in the conditions applied to their bases.

The collectors of transistors $Q_{15}$ and $Q_{16}$ are connected directly to the bases of the output transistors $Q_{23}$ and $Q_{24}$ of the differential amplifier section. The collectors of transistors $Q_{23}$ and $Q_{24}$ are connected directly to each other and to the B+ voltage source. The emitters of transistors $Q_{23}$ and $Q_{24}$, which serve as output terminals 13 and 14 for the differential amplifier section, are connected to a network 17 which will be described in detail below. The network includes resistances $R_{29}$ and $R_{33}$ which are serially connected between the emitter of the first output transistor $Q_{23}$ and ground and resistances $R_{31}$ and $R_{36}$ which are serially connected between the emitter of the second output transistor $Q_{24}$ and ground.

The four amplifier stages of transistor pairs $Q_1$ and $Q_2$, $Q_{13}$ and $Q_{14}$, $Q_{15}$ and $Q_{16}$, and $Q_{23}$ and $Q_{24}$ provide a balanced differential amplifier. Under balanced quiescent conditions of no input signal the voltages at the input terminals 11 and 12 are equal, and equal voltages appear at the output terminals 13 and 14. As will be explained below feedback circuitry is employed to insure balanced voltages at the output terminals 13 and 14 under quiescent conditions. When an input signal is sapplied to the input terminals which, for example, causes conduction to increase through the first input transistor $Q_1$ and decrease through the second input transistor $Q_2$, the voltage at the first output terminal 13 increases from the quiescent voltage and voltage at the second output terminal 14 decreases from the quiescent voltage by an equal amount.

OUTPUT TERMINAL NETWORK

The network 17 associated with the output terminals 13 and 14 of the differential amplifier section 10 also includes equal resistances $R_{27}$ and $R_{28}$ which are serially connected between the two output terminals 13 and 14. The connecting point 18 of the two resistances may be designated as a reference voltage terminal. The voltage at the reference voltage terminal 18 is determined by the quiescent voltages at the output terminals 13 and 14, and is equal to the quiescent voltages less the voltage drops across resistances $R_{27}$ and $R_{28}$, respectively. Since the voltages at the output terminals change by equal amounts but opposite polarity in response to input signals, the reference voltage at the terminal 18 is independent of input signals.

The network 17 also includes resistances $R_{30}$ and $R_{35}$ which are serially connected between the reference voltage terminal 18 and ground. A reference coupling transistor $Q_{26}$ has its base connected to the connecting point between resistances $R_{30}$ and $R_{35}$, its collector connected directly to the B+ voltage source, and its emitter connected through resistance $R_{34}$ to ground. Thus, a voltage related to the reference voltage at the reference voltage terminal 18 is produced at the emitter of transistor $Q_{26}$.

A first coupling transistor $Q_{25}$ has its base connected to the connecting point between resistances $R_{29}$ and $R_{33}$, its collector connected directly to the B+ voltage source, and its emitter connected through resistance $R_{32}$ to ground. A second coupling transistor $Q_{27}$ has its base connected to the connecting point between resistances $R_{31}$ and $R_{36}$, its collector connected directly to the B+ voltage source, and its emitter connected through resistance $R_{37}$ to ground.

Resistances $R_{29}$, $R_{33}$, and $R_{32}$ are equal to the resistances $R_{31}$ $R_{36}$, and $R_{37}$, respectively, and related to restances $R_{30}$, $R_{35}$, and $R_{34}$ so that under balanced quiescent conditions the voltages at the emitters of transistors $Q_{25}$, $Q_{27}$, and $Q_{26}$ are equal. Changes from the balanced voltage conditions at the output terminals 13 and 14 cause changes in the voltages at the emitters of coupling transistors $Q_{25}$ and $Q_{27}$ so that they differ from the voltage at the emitter of the reference coupling transistor $Q_{26}$ by equal amounts of opposite polarity.

SIGNAL COMPARISON CIRCUIT

The emitters of transistors $Q_{25}$ and $Q_{27}$ and the reference voltage terminal 18 are connected to a signal comparison circuit 20 which detects the presence of a signal at the output terminals 13 and 14 of the differential amplifier and produces a signal at its signal output terminal 21 which is independent of the polarity of the input signal. The signal comparison circuit includes a first signal gating transistor $Q_{28}$ having its base connected directily to the emitter of the first coupling transistor $Q_{25}$ and a second signal gating transistor $Q_{29}$ having its base connected directly to the emitter of the second coupling transistor $Q_{27}$. The collectors of the signal gating transistors $Q_{28}$ and $Q_{29}$ are connected directly to each other and by way of a diode $Q_{30}$ and a resistance $R_{39}$ to the B+ voltage source. The connecting point 21 between the diode $Q_{30}$ and the resistance $R_{39}$ may be designated as the signal output terminal of the comparison circuit. The emitters of the signal gating transistors $Q_{28}$ and $Q_{29}$ are connected directly to each other and through a resistance $R_{38}$ to a strobe gate 22, the operation of which will be explained below. The two signal gating transistors $Q_{28}$ and $Q_{29}$ provide an OR circuit arrangement in which conduction through either transistor causes conduction through resistance $R_{39}$ thereby reducing the voltage at the signal output terminal 21

The signal comparison circuit also includes a biasing or threshold setting arrangement employing a transistor means consisting of two transistors $Q_{31}$ and $Q_{32}$ having their collectors connected together and the emitter of transistor $Q_{32}$ connected to the base of transistor $Q_{31}$. The base of transistor $Q_{32}$ is connected directly to the reference voltage terminal 18 and its emitter is connected through a resistance $R_{40}$ to ground. The collectors of transistors $Q_{32}$ and $Q_{31}$ are connected directly to the B+ voltage source and the emitter of transistor $Q_{31}$ is connected directly to the emitters of the signal gating transistors $Q_{28}$ and $Q_{29}$ and thus through the resistance $R_{38}$ to the strobe gate 22.

The strobe gate 22 provides either a low impedance or a high impedance between the resistance $R_{38}$ and ground depending upon whether it is in the conducting or non-conducting condition. A strobe input transistor $Q_{39}$ has its emitter connected directly to a strobe input terminal 23 and its base connected through a resistance $R_{41}$ to the B+ voltage source. Its collector is connected directly to the base of a coupling transistor $Q_{40}$ which has its collector connected through a resistance $R_{42}$ to the B+ voltage source and its emitter connected through resistance $R_{43}$ to ground. The emitter of transistor $Q_{40}$ is also connected directly to the base of a strobe output transistor $Q_{41}$. The emitter of transistor $Q_{41}$ is connected directly to ground and the collector is connected directly to the resistance $R_{38}$.

When a relatively low voltage level, approaching ground potential, is applied to the strobe input terminal 23, heavy current flows through the resistance $R_{41}$ and across the base-emitter junction of the transistor $Q_{39}$, thus producing a low voltage at the base. The resulting voltage at the collector is sufficiently low to cause transistor $Q_{40}$ to operate in a low conducting condition. Thus transistor $Q_{41}$ is biased to a non-conducting condition and that transistor provides a high impedance to current flow from the emitters of the signal comparison transistors. When the strobe gate is in this condition, the high impedance of transistor $Q_{41}$ prevents signal gating transistors $Q_{28}$ and $Q_{29}$ and the biasing transistor combination $Q_{32}$, $Q_{31}$ from conducting regardless of the voltages applied to their bases.

When a high voltage level is applied to the strobe input terminal 23, current flow through resistance $R_{41}$ and across the base-emitter junction of transistor $Q_{39}$ is reduced and the voltage at the base of transistor $Q_{39}$ increases. The voltage at the collector also rises, thus causing increases conduction through transistor $Q_{40}$. Current through transistor $Q_{40}$ flows into the base of transistor $Q_{41}$ causing that transistor to conduct heavily and provide a low impedance between resistance $R_{38}$ and ground.

When the strobe gate 22 output transistor $Q_{41}$ is conducting, the transistor combination $Q_{32}$, $Q_{31}$ conducts and produces a bias voltage at the emitters of transistors $Q_{28}$ and $Q_{29}$ which is equal to the voltage at the reference voltage terminal 18 less the base-emitter voltage drops of the two transistors $Q_{32}$ and $Q_{31}$. Since this emitter bias voltage is higher than the quiescent condition voltages applied to the bases of the signal gating transistors $Q_{28}$ and $Q_{29}$, the signal gating transistors are biased to the non-conducting condition. A relatively high voltage level is thus established at the signal output terminal 21.

When an unbalanced condition exists in the differential amplifier section, current flow through the two coupling transistors $Q_{25}$ and $Q_{27}$ is altered thereby increasing the voltage at the emitter of one of the transistors and decreasing it at the other. Since both signal gating transistors $Q_{28}$ and $Q_{29}$ are normally biased in the non-conducting condition, there is no change in the condition of the transistor having its base connected to the coupling transistor with the reduced voltage at its emitter. When the voltage at the base of the other signal gating transistor increases sufficiently to forward bias its base-emitter junction, current flows through that transistor rather than through the biasing transistor combination $Q_{32}$, $Q_{31}$. Since current flow from the B+ voltage source into the signal gating transistor is through resistance $R_{39}$, a relatively low voltage output signal is produced at the signal output terminal 21.

As mentioned previously the bias voltage at the emitters is the reference voltage at the reference voltage terminal 18 less the voltage drop across the base-emitter junctions of the biasing transistors $Q_{32}$ and $Q_{31}$. The reference voltage thus establishes the minimum voltage which must be applied to the base of a signal gating transistor to produce an output signal at the signal output terminal. Thus, a threshold level is established at the input terminals 11 and 12 of the circuit. Pulses, including noise, which are less than the threshold level are rejected by the circuit. Only an input signal which exceeds the threshold level affects a signal gating transistor, while the strobe gate 22 is conducting, and produces a signal at the signal output terminal 21.

MONO-STABLE MULTIVIBRATOR OUTPUT CIRCUIT

The signal output terminal 21 of the signal comparison circuit is connected to a mono-stable or one-shot multivibrator output circuit 25 which produces a single pulse of precise level and duration at its output terminal 26 for each low level signal at the signal output terminal 21. The signal output terminal 21 is connected through a capacitance $C_3$ to the base of the transistor $Q_{33}$. The base of transistor $Q_{33}$ is also connected through a resistance $R_{44}$ to the B+ voltage source, the collector is connected through a resistance $R_{45}$ to the B+ voltage source, and the emitter is connected directly to ground. The collector of transistor $Q_{33}$ is also connected through a resistance $R_{46}$ to the base of a second transistor $Q_{34}$. The collector of transistor $Q_{34}$ is connected directly to the signal output terminal 21 and its emitter is connected directly to ground. The collector of transistor $Q_{33}$ is also connected directly to the base of a coupling transistor $Q_{35}$ which has its collector connected to the B+ voltage source through a resistance $R_{47}$ and its emitter connected to ground through a resistance $R_{48}$. The emitter of transistor $Q_{35}$ is also connected to a final output transistor $Q_{36}$ having its emitter connected to ground and its collector connected directly to the final output terminal 26. Pull-up transistors $Q_{37}$ and $Q_{38}$ have their collectors tied directly together and connected to the B+ voltage source through a resistance $R_{50}$. The base of transistor $Q_{37}$ is connected directly to the collector of transistor $Q_{35}$. The emitter of transistor $Q_{37}$ is connected directly to the base of transistor $Q_{38}$ and through resistance $R_{49}$ to ground. The emitter of transistor $Q_{38}$ is connected directly to the final output terminal 26.

Under the no-signal condition when both signal gating transistors $Q_{28}$ and $Q_{29}$ are in the non-conducting condition, the voltage at the signal output terminal 21 is relatively high, approaching the voltage of the B+ voltage source. This voltage biases transistor $Q_{33}$ to conduction and current flows through resistance $R_{45}$ producing a low voltage at the collector of transistor $Q_{33}$ thus biasing transistor $Q_{35}$ in a low conducting condition. With transistor $Q_{35}$ in a low conducting condition transistor $Q_{36}$ is biased to a non-conducting condition. The voltage at the final output terminal 26 is, therefore, at a high level since transistor $Q_{36}$ provides a high impedance between the final output terminal 26 and ground. Transistor $Q_{34}$ is also biased to a non-conducting condition by virtue of the connection between the base of transistor $Q_{34}$ and the collector of transistor $Q_{33}$.

When either transistor $Q_{28}$ or $Q_{29}$ in the signal comparison circuit conducts, the voltage at the signal output terminal 21 is reduced. This voltage level is transmitted through the capacitance $C_3$ to the base of transistor $Q_{33}$ reducing conduction through that transistor. As conduction through transistor $Q_{33}$ decreases, the voltage at its collector increases causing both transistors $Q_{34}$ and $Q_{35}$ to conduct. Current flow in the collector circuit of transistor $Q_{34}$ flows through resistance $R_{39}$ causing the voltage at the base of transistor $Q_{33}$ to remain low. This action is regenerative and transistors $Q_{33}$ and $Q_{34}$ switch operating states very rapidly with transistor $Q_{34}$ becoming saturated. As conduction increases through transistor $Q_{35}$, the voltage at its emitter is increased and current flows into the base of transistor $Q_{36}$ causing that transistor to conduct heavily into saturation. The voltage at the final output terminal 26 is thus reduced to a very low level, approaching ground potential.

With the output circuit switched to the operating condition as described, current flows through resistance $R_{44}$ to charge capacitance $C_3$. When the capacitance has charged sufficiently, transistor $Q_{33}$ is biased to conduction thereby reducing the voltage at the collector of transistor $Q_{33}$. The reduced voltages at the bases of transistors $Q_{34}$ and $Q_{35}$ causes conduction through these transistors to decrease. Because transistor $Q_{34}$ conducts less, the voltage at the signal output terminal 21 rises, augmenting the switching action and rapidly restoring transistor $Q_{33}$ to the conducting condition and transistor $Q_{34}$ to the non-conducting condition.

As current flow through transistor $Q_{35}$ decreases, the voltage at the base of the output transistor $Q_{36}$ is lowered causing that transistor to turn off. The voltage at the collector of transistor $Q_{35}$ increases causing transistor $Q_{37}$ and $Q_{38}$ to conduct heavily, supplying current to rapidly charge any load on the final output terminal 26. Transistors $Q_{37}$ and $Q_{38}$ conduct only until the voltage at the final output terminal 26 is restored to the voltage level determined by the B+ voltage source less the leakage current voltage drop across resistance $R_{47}$ and the base-emitter voltage drops across transistors $Q_{37}$ and $Q_{38}$.

The one-shot multivibrator output circuit 25 operates in the foregoing manner to produce output pulses having very fast rise and fall times, uniform signal level, and uniform duration. Pulse duration is controlled by the charging time of capacitance $C_3$ through resistance $R_{44}$. Diode $Q_{30}$ is provided to prevent reverse current flow from the signal comparison circuit 20 into the monostable multivibrator circuit after current has stopped flowing through the signal gating transistor and before capacitance $C_3$ has charged sufficiently to restore transistor $Q_{33}$ to the conducting condition.

FEEDBACK ARRANGEMENT

The emitters of the coupling transistors $Q_{25}$, $Q_{26}$, and $Q_{27}$ are connected to feedback comparators 27 and 28 which control feedback transistors $Q_3$ and $Q_4$ in such a manner as to alter the voltages at the collectors of the input transistors $Q_1$ and $Q_2$ of the differential amplifier section whereby the quiescent voltages at the amplifier output terminals 13 and 14 are balanced. The first feedback comparator 27 includes a pair of transistors $Q_{19}$ and $Q_{20}$ having their bases connected directly to the emitters of reference coupling transistor $Q_{26}$ and the first coupling transistor $Q_{25}$, respectively. Their emitters are connected directly to each other and through a resistance $R_{23}$ to ground. The collector of the first transistor $Q_{19}$ of the pair is connected to the B+ voltage source through a resistance $R_{24}$ and a by-pass capacitance $C_1$ in parallel with the resistance. The collector of the first transistor $Q_{19}$ of the pair is also connected directly to the base of the first feedback transistor $Q_3$. The collector of the second transistor $Q_{20}$ of the pair is connected directly to the B+ voltage source.

The second comparator 28 includes a second pair of transistors $Q_{21}$ and $Q_{22}$. The bases of the first transistor $Q_{22}$ and the second transistor $Q_{21}$ of the second pair are connected directly to the emitters of the reference coupling transistor $Q_{26}$ and the second coupling transistor $Q_{27}$, respectively. The emitters of the transistors $Q_{21}$ and $Q_{22}$ are connected directly to each other and through a resistance $R_{25}$ to ground. The collector of the first transistor $Q_{22}$ of the pair is connected to the B+ voltage source through a resistance $R_{26}$ and a by-pass capacitance $C_2$ in parallel with the resistance. The collector of the first transistor $Q_{22}$ is also connected directly to the base of the second feedback transistor $Q_4$. The collector of the second transistor $Q_{21}$ is connected directly to the B+ voltage source.

As mentioned previously the voltages at the emitters of the coupling transistors $Q_{25}$, $Q_{26}$, and $Q_{27}$ are equal when the voltages at the two output terminals 13 and 14 of the differential amplifier section are equal. When the equal voltages are applied to the bases of transistors $Q_{19}$ and $Q_{20}$ of the first comparator, the current flow through each transistor of the pair is equal. Similarly when the equal voltages are applied to the bases of transistors $Q_{22}$ and $Q_{21}$ of the second comparator, the current flow through each transistor of that pair is equal. Since corresponding components of the two comparators are the same, equal voltages are produced at the collectors of transistors $Q_{19}$ and $Q_{22}$. With these equal voltages applied to the bases of the feedback transistors $Q_3$ and $Q_4$ the voltage drops across their base-emitter junctions are equal, and therefore equal voltages are provided at the collectors of the input transistors $Q_1$ and $Q_2$ of the differential amplifier section.

Whenever a voltage differential occurs between the two output terminals 13 and 14, conduction through coupling transistors $Q_{25}$ and $Q_{27}$ is altered and the voltage at the emitter of one increases and that at the emitter of the other decreases. For example, when the voltage at the first output terminal 13 goes up, and that at the second output terminal 14 goes down, the voltage at the emitter of transistor $Q_{25}$ also increases and that at the emitter of transistor $Q_{27}$ also decreases. The voltage at the emitter of the reference coupling transistor $Q_{26}$ does not change. Under these conditions conduction through the second transistor $Q_{20}$ of the first comparator increases and conduction through the corresponding transistor $Q_{21}$ of the second comparator decreases, while conduction through the first transistor $Q_{19}$ of the first comparator decreases and conduction through the first transistor $Q_{22}$ of the second comparator increases. These changes in current flow tend to increase the voltage at the collector of the first transistor $Q_{19}$ of the first comparator and decrease the voltage at the collector of the first transistor $Q_{22}$ of the second comparator.

Because of the by-pass capacitances $C_1$ and $C_2$ changes in current flow of an A.C. nature, such as those caused by transients or by input signals at the input terminals 11 and 12, do not affect current flow through the collector resistances $R_{24}$ and $R_{26}$ nor the voltages at the collectors of transistors $Q_{19}$ and $Q_{22}$. That is, voltage differential signals are produced at the collectors of transistors $Q_{19}$ and $Q_{22}$ only in response to a steady-state imbalance situation tending to cause the quiescent voltage at the output terminals 13 and 14 to differ.

The voltage differentials are transmitted through feedback transistors $Q_2$ and $Q_4$ and produce equal but opposite shifts in the voltages at the collectors of the input transistors $Q_1$ and $Q_2$. In accordance with the present example the voltage at the collector of the first input transistor $Q_1$ is increased and that at the collectors of the second input transistor $Q_2$ is decreased. These changes are propagated through the differential amplifier section tending to affect operation of amplifier output transistors $Q_{23}$ and $Q_{24}$ so as to equalize the voltages at the output terminals 13 and 14. Thus, when any situation exists which tends to unbalance the quiescent voltages at the output terminals 13 and 14, feed-back signals are produced by the comparators 27 and 28 which cause the amplifier to compensate for the situation and restore the voltage levels at the output terminals 13 and 14 to a balanced condition.

INPUT CONTROL CIRCUIT

The sense amplifier circuit as shown in the drawing also includes means obviating the effects of pulses at the input terminals 11 and 12. A switching arrangement 30 is controlled by the voltage applied at its input terminal 31 so as to cause current from the constant current source 15 to flow either through the input transistors $Q_1$ and $Q_2$ or through the by-pass transistors $Q_5$ and $Q_6$. The bases of by-pass transistors $Q_5$ and $Q_6$ are connected directly to ground. Therefore, when these transistors are operating, the differential amplifier is held in a quiescent condition regardless of voltages at the input terminals 11 and 12.

The constant current source 15 includes a combination of transistors $Q_9$ and $Q_{10}$ having their collectors connected together and the emitter of transistor $Q_{10}$ connected directly to the base of transistor $Q_9$. The emitter of transistor $Q_9$ is connected to the B− voltage source through a resistance $R_{10}$. Transistors $Q_{10}$ and $Q_9$ are biased to conduction by the connection of the base of transistor $Q_{10}$ to the voltage divider consisting of resistances $R_{11}$, $R_{12}$, and $R_{13}$ serially connected between ground and the B− voltage source.

The constant current source 15 is coupled to the input transistors $Q_1$ and $Q_2$ and the by-pass transistors $Q_5$ and $Q_6$ by switching transistors $Q_8$ and $Q_{11}$ connected between the collectors of transistors $Q_9$ and $Q_{10}$ and the emitter resistances $R_3$ and $R_4$, and $R_5$ and $R_6$, respectively. Whichever switching transistor, $Q_8$ or $Q_{11}$, has its base-emitter junction more heavily forward biased is energized and conducts current from the constant current source 15 to operate either the input transistors $Q_1$ and $Q_2$ or the by-pass transistors $Q_5$ and $Q_6$.

The collector of the first switching transistor $Q_8$ is connected directly to the resistances $R_3$ and $R_4$ and its emitter is connected directly to the collectors of transistors $Q_9$ and $Q_{10}$. A transistor $Q_7$ has its collector connected directly to ground and its emitter connected to the base of transistor $Q_8$. It base is connected to a voltage divider consisting of resistances $R_7$, $R_8$, and $R_9$ serially connected between B+ and the B− voltage source. The collector of the second switching transistor $Q_{11}$ is connected to the emitters of by-pass transistors $Q_5$ and $Q_6$ through resistances $R_5$ and $R_6$, respectively. The emitter of transistor $Q_{11}$ is connected directly to the collectors of transistors $Q_9$ and $Q_{10}$. The base of transistor $Q_{11}$ is connected directly to the emitter of transistor $Q_{12}$ which has its collector connected directly to ground and its base connected between the resistances $R_{11}$ and $R_{12}$.

A control section 32 of the switching arrangement includes a transistor $Q_{42}$ having its emitter connected directly to the input terminal 31. The base of transistor $Q_{42}$ is connected to the B+ voltage source through resistance $R_{51}$ and its collector is connected directly to the base of a coupling transistor $Q_{43}$. The collector of transistor $Q_{43}$ is connected to the B+ voltage source through a resistance $R_{52}$ and its emitter is connected to ground through resistance $R_{53}$. The emitter of transistor $Q_{43}$ is also connected directly to the base of transistor $Q_{44}$. The emitter of transistor $Q_{44}$ is connected directly to ground and its collector is connected between resistances $R_7$ and $R_8$.

The control section 32 operates in the same manner as the strobe gate 22 discussed above. When a low voltage level is applied to the input terminal 31, heavy current flows through resistance $R_{51}$ and across the base-emitter junction of transistor $Q_{42}$. This condition biases transistor $Q_{43}$ in a low conduction condition, which in turn biases transistor $Q_{44}$ in the non-conducting condition. Transistor $Q_{44}$ thus presents a relatively high impedance between its collector and ground. Therefore, the voltage occurring at the base of transistor $Q_7$ is established by the voltage divider $R_7$, $R_8$, and $R_9$ connected between B+ and the B− voltage source. The values of resistances $R_{11}$, $R_{12}$, and $R_{13}$ are such that the voltage occurring at the base of transistor $Q_{12}$ is less than that produced at the base of transistor $Q_7$. Thus, current flows through transistor $Q_7$ and into switching transistor $Q_8$. Since the base-emitter junction of transistor $Q_8$ is more heavily forward biased than that of switching transistor $Q_{11}$, current from the constant current source 15 is directed through input transistors $Q_1$ and $Q_2$ rather than through by-pass transistors $Q_5$ and $Q_6$.

When a relatively high voltage level is applied to the input terminal 31 of the control section 32, current flow through resistance $R_{51}$ decreases and the voltage at the base and the collector of transistor $Q_{42}$ increases. Transistor $Q_{43}$ is biased to a high conduction condition and current flows into the base of transistor $Q_{44}$ causing that transistor to conduct into saturation. Transistor $Q_{44}$ acts as a very low impedance to ground, and the voltage at the base of transistor $Q_7$ is reduced. The values of resistances $R_8$, $R_9$, $R_{11}$, $R_{12}$, and $R_{13}$ are such that the voltage at the base of transistor $Q_7$ is reduced below the voltage at the base of transistor $Q_{12}$. Therefore, the base-emitter junction of switching transistor $Q_{11}$ is more heavily forward biased than that of switching transistor $Q_8$, and current from the constant current source 15 is directed through the by-pass transistors $Q_5$ and $Q_6$ rather than through the input transistor $Q_1$ and $Q_2$.

When switching transistor $Q_8$ is energized, the sense amplifier circuit operates as previously described and responds to signal pulses applied at the input terminals 11 and 12. When switching transistor $Q_{11}$ is energized, operation of the circuit is stabilized in the quiescent condition since, in effect, the input to the circuit is at the bases of transistors $Q_5$ and $Q_6$, which are grounded. Thus, the input to the sense amplifier circuit may be inactivated as desired so that conditions at the input terminals will not cause improper shifting of the quiescent operating conditions of the circuit.

CONCLUSION

The circuit of the invention as described is amenable to fabrication as a monolithic integrated circuit within one or two chips of semiconductor material, except for by-pass capacitances $C_1$ and $C_2$. The values of these capacitances are relatively large and with the present state of the art are best arranged externally of the semiconductor chips. Since all the resistance components may be fabricated simultaneously by diffusion into the semiconductor material, the ratios of their values are extremely well controlled despite deviations from optimum absolute values.

The network 17 produces voltages at the reference terminal 18 and at the emitters of the coupling transistors $Q_{25}$, $Q_{26}$, and $Q_{27}$ which are determined primarily by the ratios of the values of the network components rather than by their absolute values. The voltages taken from these connecting points of the network 17 control the threshold level of the amplifier and also regulate the feedback arrangement. These critical voltages are all determined by the voltages at the output terminals 13 and 14 and the network 17. None of these voltages is at a fixed voltage as determined by a source of fixed potential, for example, ground. Thus, under changing conditions the values of these critical voltages change, but always with particular relationships between them.

The circuit of the invention also provides means for predetermining the variation of threshold level with temperature. The balanced quiescent voltages at the output terminals 13 and 14 determine the threshold level of the circuit. Since the constant current source 16 controls the total amount of current which flows through the amplifier stage of transistors $Q_{15}$ and $Q_{16}$ and, therefore, the voltages at the bases of the output transistors $Q_{23}$ and $Q_{24}$, the constant current source 16 serves to regulate the voltages at the output terminals 13 and 14. Since the changes in component values with temperature are proportional, the ratios of component values may be selected such that changes in current from the constant current source 16 are compensated for by changes in the reference voltage at the reference voltage terminal 18 and a relatively constant threshold level is maintained over a wide temperature range.

Under certain circumstances it may be desirable to permit the threshold level to change with temperature, for example, in order to match the changing characteristics of the ferrite core with temperature. Since values of voltages at the output terminals 13 and 14 and throughout the network 17 depend upon relative characteristics of components, the threshold level can be made variable with temperature in a desired manner by appropriate selection of component relationships.

While there has been shown and described what is considered a preferred embodiment of the present invention, it will be obvious to those skilled in the art that various changes and modifications may be made therein without departing from the invention.

What is claimed is:

1. A sense amplifier circuit including in combination differential amplifier means having first and second input terminals adapted to receive input signals and having first and second output terminals;

reference voltage means associated with said first and second output terminals and operable to produce a reference voltage determined by the quiescent voltages at said output terminals and independent of input signals applied to said input terminals;

signal comparison means connected to said first output terminal, said second output terminal, and said reference voltage means and operable to produce an output signal when the voltage at either of said output terminals differs from said reference voltage by a predetermined amount;

feedback comparison means connected to said first output terminal, said second output terminal, and said reference voltage means; said feedback comparison means being operable to compare the quiescent voltage at the first output terminal with the reference voltage and the quiescent voltage at the second output terminal with the reference voltage and to produce feedback signals indicative of the voltage differentials between the quiescent voltage at the first output terminal and the reference voltage and between the quiescent voltage at the second output terminal and the reference voltage; and feedback means connected to the feedback comparison means and the differential amplifier means and operable in response to said feedback signals from the feedback comparison means to modify quiescent operation of the differential amplifier means in such a manner that said voltage differentials are equalized.

2. A sense amplifier circuit in accordance with claim 1 wherein said signal comparison means comprises signal output means having a first input connection, a second input connection, and a signal output terminal;

biasing means connected to said reference voltage means and to the signal output means and operable to bias the signal output means to an operating condition whereby a first signal condition is produced at the signal output terminal; and means connecting said first output terminal to said first input connection and said second output terminal to said second input connection, said means being operable to switch the signal output means to another operating condition in response to the presence of a voltage at either of said output terminals which differs from the reference voltage by a predetermined about whereby a second signal condition is produced at the signal terminal; and said feedback comparison means comprises first feedback signal means having a first input connection, a second input connection, and a first feedback signal output connection;

first circuit means connecting the first input connection of the first feedback signal means to the reference voltage means and the second input connection of the first feedback signal means to the first output terminal, and operable to apply voltages to the input connections of the first feedback signal means causing the first feedback signal means to produce a balanced condition feedback signal at said first feedback signal output connection when the quiescent voltages at the first and second output terminals are equal;

second feedback signal means having a first input connection, a second input connection, and a second feedback signal output connection; and second circuit means connecting the first input connection of the second feedback signal means to the reference voltage means and the second input connection of the second feedback signal means to the second output terminal, and operable to apply voltages to the input connections of the second feedback signal means causing the second feedback signal means to produce the balanced condition feedback signal at said second feedback signal output connection when the quiescent voltages at the first and second output terminals are equal;

said first and second circuit means being operable to apply voltages to the input connections of the first and second feedback signal means causing the first and second feedback signal means to produce feedback signals at the first and second feedback signal output connections having differences from said balanced condition feedback signal indicative of the difference in voltages between the first and second output terminals when the quiescent voltages at the first and second output terminals are unequal.

3. A sense amplifier circuit in accordance with claim 1 wherein said signal comparison means comprises a signal output terminal;

first signal gating means having an input connection connected to said first output terminal and an output connection connected to said signal output terminal;

second signal gating means having an input connection connected to said second output terminal and an output connection connected to said signal output terminal;

biasing means connected to said reference voltage means and to the first and second signal gating means and operable to bias the first and second signal gating means to a first conduction condition;

said first signal gating means being operable in a second conducting condition in response to the presence of a voltage at the first output terminal which differs from the reference voltage by a predetermined amount whereby an output signal is produced at the signal output terminal; and said second signal gating means being operable in a second conducting condition in response to the presence of a voltage at the second output terminal which differs from the reference voltage by a predetermined amount whereby an output signal is produced at the signal output terminal; and said feedback comparison means comprises first feedback signal means having a first input connection, a second input connection, and a first feedback signal output connection;

first circuit means connecting the first input connection of the first feedback signal means to the reference voltage means and the second input connection of the first feedback signal means to the first output terminal, and operable to apply voltages to the input connections of the first feedback signal means causing the first feedback signal means to produce a balanced condition feedback signal at said first feedback signal output connection when the quiescent voltages at the first and second output terminals are equal;

second feedback signal means having a first input connection, a second input connection, and a second feedback signal output connection; and second circuit means connecting the first input connection of the second feedback signal means to the reference voltage means and the second input connection of the second feedback signal means to the second output terminal, and operable to apply voltages to the input connections of the second feedback signal means causing the second feedback signal means to produce the balanced condition feedback signal at said second feedback signal output connection when the quiescent voltages at the first and second output terminals are equal;

said first and second circuit means being operable to apply voltages to the input connections of the first and second feedback signal means causing the first and second feedback signal means to produce feedback signals at the first and second feedback signal output connections having differences from said balanced condition feedback signal indicative of the difference in voltages between the first and second output terminals when the quiescent voltages at the first and second output terminals are unequal.

4. A sense amplifier circuit in accordance with claim 1 wherein said signal comparison means comprises a first signal gating transistor;

a second signal gating transistor having its emitter connected directly to the emitter of the first signal gating transistor and its collector connected directly to the collector of the first signal gating transistor;

biasing means connected to said reference voltage means and to the emitters of the first and second signal gating transistors and operable to produce a biasing voltage related to said reference voltage at the emitters of the first and second gating transistors;

means connecting the base of the first signal gating transistor to said first output terminal and operable to bias the first signal gating transistors in the non-conducting condition when a quiescent voltage is present at said first output terminal and operable to bias the first signal gating transistor in the conducting condition when the voltage at the first output terminal differs from the reference voltage by a predetermined amount; and means connecting the base of the second signal gating transistor to said second output terminal and operable to bias the second signal gating transistor in the non-conducting condition when a quiescent voltage is present at said second output terminal and operable to bias the second signal gating transistor in the conducting condition when the voltage at the second output terminal differs from the reference voltage by a predetermined amount; and said feedback comparison means comprises first comparator means including a first pair of transitsors having the emitter of the first transistor of the pair connected directly to the emitter of the second transistor of the pair;

first circuit means connecting the base of the first transistor of the first pair to said reference voltage means and the base of the second transistor of the first pair to said first output terminal and operable to apply equal bias voltages to the bases of the first and second transistors of the first pair biasing the transistors to conduction when the voltages at the first and second output terminals are equal;

second comparator means including a pair of transistors having the emitters of the first transistor of the pair connected directly to the emitter of the second transistor of the pair;

second circuit means connecting the base of the first transistor of the second pair to said reference voltage means and the base of the second transistor of the second pair to said second output terminal and operable to apply equal bias voltages to the bases of the first and second transistors of the second pair biasing the transistors to conduction when the voltages at the first and second output terminals are equal;

said first and second circuit means being operable to cause increased conduction through the first transistor of one of said pairs and the second transistor of the other of said pairs and decreased conduction through the first transistor of the other of said pairs and the second transistor of the one of said pairs when the voltage at the first output terminal is greater than the voltage at the second output terminal, and being operable to cause increased conduction through the first transistor of the other of said pairs and the second transistor of the one of said pairs and decreased conduction through the first transistor of the one of said pairs and the second transistor of the other of said pairs when the voltage at the second output terminals is greater than the voltage at the first output terminal;

a first feedback output means connected to the collector of a transistor of the first pair of transistors;

a second feedback output means connected to the collector of the corresponding transistor of the second pair of transistors;

said first and second feedback output means being operable to produce equal feedback signal voltages at said collectors when equal bias voltages are applied at the bases of the first and second transistors of the first pair and equal bias voltages are applied at the bases of the first and second transistors of the second pair, and being operable to produce feedback signal voltages at said collectors having a voltage differential indicative of the difference in conduction between the first and second transistors of each pair; and signal by-pass means connected to said collectors and operable to prevent changes in voltages at the first and second output terminals caused by input signals applied at said input terminals from affecting the voltages at said collectors.

5. A sense amplifier circuit in accordance with claim 4 wherein said differential amplifier means includes a first output transistor having its emitter connected directly to said first output terminal;

a second output transistor having its emitter connected directly to said second output terminal; and means connecting said first and second input terminals to the bases of said first and second output transistors, said means being operable to produce equal bias voltages at said bases when said differential amplifier means is in a balanced quiescent condition, and being operable to produce voltages at said bases varying from said balanced quiescent condition bias voltages by equal and opposite amounts in response to input signals applied at said input terminals;

said reference voltage means associated with said first and second output terminals includes a first resistance connected between the first output terminal and a reference terminal;

a second resistance of equal resistance value to the first resistance connected between the second output terminal and the reference terminal; and reference resistance means connected between the reference terminal and a source of fixed potential;

said first and second circuit means include first resistance means connected between the first output terminal and the source of fixed potential;

second resistance means connected between the second output terminal and the source of fixed potential;

a reference coupling transistor having its base connected to the reference resistance means and its emitter connected directly to the base of said first transistor of the first pair of transistors and to the base of said first transistor of the second pair of transistors;

a first coupling transistor having its base connected to said first resistance means and its emitter connected directly to the base of said second transistor of the first pair of transistor; and a second coupling transistor having its base connected to said second resistance means and its emitter connected directly to the base of said second transistor of the second pair of transistors;

said biasing means includes a transistor means having an input connection connected to the reference terminal and an output connection connected directly to the emitters of the first and second signal gating transistors;

the base of the first signal gating transistor is connected directly to the emitter of the first coupling transistor; and the base of the second signal gating transistor is connected directly to the emitter of the second coupling transistor.

6. A sense amplifier circuit in accordance with claim 5 wherein said differential amplifier means includes a first input transistor having its base connected to said first input terminal;

a second input transistor having its base connected to said second input terminal;

constant current means connected to the emitters of the first and second input transistors and operable to maintain constant the total current flowing through the first and the second input transistors independent of input signals applied at the input terminals; and means connecting the collectors of the first and second input transistors to the bases of the first and second output transistors, said means being operable to produce equal bias voltages at the bases of the first and second output transistors when the voltage at the collector of the first input transistor is equal to the voltage at the collector of the second input transistor, and being operable to produce voltages at said bases varying from said equal voltages by equal and opposite amounts in response to a differential between the voltage at the collector of the first input transistor and the voltage at the collector of the second input transistor;

said feedback means includes a first feedback transistor having its base connected to said collector of a transistor of the first pair of transistors and its emitter connected to the collector of the first input transistor; and a second feedback transistor having its base connected to said collector of the corresponding transistor of the second pair of transistors and its emitter connected to the collector of the second input transistor;

said feedback transistors being operable to alter the voltages at the collectors of the first and second input transistors in response to the voltage differential of the feedback signal voltages at said collectors of the transistors of the first and second pair.

7. A sense amplifier circuit in accordance with clami 6 wherein said differential amplifier means includes a first by-pass transistor having its collector connected to the collector of the first input transistor;

a second by-pass transistor having its collector connected to the collector of the second input transistor;

the bases of the first and second by-pass transistors being connected to a source of fixed potential;

first switching means connecting the constant current means to the emitters of the first and second input transistors and operable when energized to permit current to flow from the constant current means through the first and second input transistors;

second switching means connecting the constant current means to the emitters of the first and second by-pass transistors and operable when energized to permit current to flow from the constant current means through the first and second by-pass transistors;

biasing means connected to the first and second switching means and operable to energize the first switching means while maintaining the second switching means unenergized; and switch control means connected to the biasing means and operable to de-energize the first switching means and energize the second switching means.

8. A sense amplifier circuit including in combination differential amplifier means having first and second input terminals adapted to receive input signals and having first and second output terminals;

reference voltage means associated with said first and second output terminals and operable to produce a reference voltage determined by the quiescent voltages at said output terminals and independent of input signals applied to said input terminals;

feedback comparison means connected to said first output terminal, said second output terminal, and said reference voltage means; said feedback comparison means being operable to compare the quiescent voltage at the first output terminal with the reference voltage and the quiescent voltage at the second output terminal with the reference voltage and to produce feedback signals indicative of the voltage differentials between the quiescent voltage at the first output terminal and the reference voltage and between the quiescent voltage at the second output terminal and the reference voltage; and feedback means connected to the feedback comparison means and the differential amplifier means and operable in response to said feedback signals from the feedback comparison means to modify quiescent operation of the dieffrential amplifier means in such a manner that said voltage differentials are equalized.

9. A sense amplifier circuit in accordance with claim 8 wherein said feedback comparison means comprises first feedback signal means having a first input connection, a second input connection, and a first feedback signal output connection;

first circuit means connecting the first input connection of the first feedback signal means to the reference voltage means and the second input connection of the first feedback signal means to the first output terminal, and operable to apply voltages to the input connections to the first feedback signal means causing the first feedback signal means to produce a balanced condition feedback signal at said first feedback signal output connection when the quiescent voltages at the first and second output terminals are equal;

second feedback signal means having a first input connection, a second input connection, and a second feedback signal output connection; and second circuit means connecting the first input connection of the second feedback signal means to the reference voltage means and the second input connection to the second feedback signal means to the second output terminal, and operable to apply voltages to the input connections to the second feedback signal means causing the second feedback signal means to produce the balanced condition feedback signal at said second feedback signal output connection when the quiescent voltages at the first and sec-output terminals are equal;

said first and second circuit means being operable to apply voltages to the input connections to the first and second feedback signal means causing the first and second feedback signal means to produce feedback signals at the first and second feedback signal output connections having differences from said balanced condition feedback signal indicative of the difference in voltages between the first and second output terminals when the quiescent voltages at the first and second output terminals are unequal.

10. A sense amplifier circuit in accordance with claim 8 wherein said feedback comparison means comprises first comparator means including a first pair of transistors having the emitter of the first transistor of the pair connected directly to the emitter of the second transistor of the pair;

first circuit means connecting the base of the first transistor of the first pair to said reference voltage means and the base of the second transistor of the first pair to said first output terminal and operable to apply equal bias voltages to the bases of the first and second transistors of the first pair biasing the transistors to conduction when the voltages at the first and second output terminals are equal;

second comparator means including a second pair of transistors having the emitter of the first transistor of the pair connected directly to the emitter of the second transistor of the pair;

second circuit means connecting the base of the first transistor of the second pair to said reference voltage means and the base of the second transistor of the second pair to said second output terminal and operable to apply equal bias voltages to the bases of the first and second transistors of the second pair biasing the transistor to conduction when the voltages at the first and second output terminals are equal;

said first and second circuit means being operable to cause increased conduction through the first transistor of one of said pairs and the second transistor of the other of said pairs and decreased conduction through the first transistor of the other of said pairs and the second transistor of the one of said pairs when the voltage at the first output terminal is greater than the voltage at the second output terminal, and being operable to cause increased conduction through the first transistor of the other of said pairs and the second transistor of the one of said pairs and decreased conduction through the first transistor of the one of said pairs and the second transistor of the other of said pairs when the voltage at the second output terminal is greater than the voltage at the first output terminal;

a first feedback output means connected to the collector of a transistor of the first pair of transistors;

a second feedback output means connected to the collector of the corresponding transistor of the second pair of transistors;

said first and second feedback output means being operable to produce equal feedback signal voltages at said collectors when equal bias voltages are applied at the bases of the first and second transistors of the first pair and equal bias voltages are applied at the bases of the first and second transistors of the second pair, and being operable to produce feedback signal voltages at said collectors having a voltage differential indicative of the difference in conduction between the first and second transistors of each pair; and signal by-pass means connected to said collectors and operable to prevent changes in voltages at the first and second output terminals caused by input signals applied at said input terminals from affecting the voltages at said collectors.

References Cited

UNITED STATES PATENTS

| | | | |
|---|---|---|---|
| 3,189,840 | 6/1965 | Braymer et al. | 330—25 |
| 3,370,245 | 2/1968 | Royce et al. | 330—69 X |

ROY LAKE, *Primary Examiner.*

J. B. MULLINS, *Assistant Examiner.*

U.S. Cl. X.R.

330—28, 30, 69